3,459,784
AMALGAM HYDRODIMERISATION OF
UNSATURATED COMPOUNDS
John David Littlehailes and John Robin Paul Clarke,
Runcorn, England, assignors to Imperial Chemical Industries Limited, London, England, a corporation of Great Britain
No Drawing. Filed Oct. 19, 1966, Ser. No. 587,649
Claims priority, application Great Britain, Nov. 1, 1965, 46,131/65
Int. Cl. C07c *121/02, 67/00*
U.S. Cl. 260—465.8                                    7 Claims

ABSTRACT OF THE DISCLOSURE

A process for the reductive dimerisation of an alpha, beta olefinically unsaturated ester or nitrile by means of an alkali- or alkaline-earth metal amalgam reduction system wherein the dimerizing nitrile or ester is contained in a polar aprotic organic solvent system that incorporates a minor proportion of a proton source and a quantity of halide ions, furnished by an anion-exchange resin bearing quaternized amine groups, the measured pH of the organic medium being controlled at a value not less than 7 by supplying hydrogen chloride gas.

---

This invention relates to the reductive dimerisation ("hydrodimerisation") of α, β olefinically unsaturated esters or nitriles by an amalgam reduction system. The invention is especially applicable in the hydrodimerisation of acrylonitrile to adiponitrile or of lower alkyl acrylates, preferably methyl or ethyl acrylate, to corresponding adipates.

The prior literature already contains references to the hydrodimerisation of olefinically unsaturated monomers. The following works may be referred to: Knunyants and Vyazankin, Invest. Akad. Nauk., S.S.S.R. Otdel Khim Nauk. (1957) 238 (English version is in Bull. Acad. Sci. U.S.S.R. Div. Chem. Sci. (1957), 243) and Dutch patent specification No. 6,504,863 (or Belgium patent specification 662,661).

The present invention provides a process for the reductive dimerisation of an α, β olefinically unsaturated ester preferably containing 1 to 4 carbon atoms in the alcohol residue or an α, β olefinically unsaturated nitrile by means of an alkali- or alkaline-earth metal amalgam reduction system wherein the dimerising nitrile or ester is contained in a polar aprotic organic solvent system that incorporates a minor proportion of a proton source (which co-operates with the amalgam to provide said reduction system) and a quantity of halide ions furnished by a anion-exchange resin bearing quaternised amine groups, and wherein the apparent pH of the organic medium is controlled at a value not less than 7 by supplying hydrogen chloride gas. Preferably, the dimerising species is acrylonitrile, or methyl or ethyl acrylate, or a substituted dimerisable derivative thereof to produce adiponitrile, or methyl or ethyl adipate, or a substituted derivative thereof.

Preferably the halide anions are chloride ions. The resin is conveniently a polystyrene resin bearing methyl quaterised amine groups.

Preferably, said proton source is water. There is no net consumption of the proton source during the reaction because it is continuously regenerated as the trend towards increasing alkalinity in the organic medium is arrested by the hydrogen chloride. The term "apparent pH" is used herein because a particular response in means used to assess levels of pH in predominantly aqueous media may not have precisely the same significance in terms of hydrogen ion concentration, in the media with which the present process is concerned, such media containing, in the preferred system, 1 to 10% by weight of water. Such means is preferably a conventional pH meter. High apparent pH values (i.e. >11.5) are to be avoided and nominal pH values on the alkaline side of neutrality are preferred. The ideal is a substantially constant pH in the range pH 8 to 10.

By the term "polar aprotic solvent" we mean a solvent of high dielectric constant, which does not act as a source of protons. A good example of such a solvent is acetonitrile. Other suitable solvents are dimethyl formamide and dimethyl sulphoxide.

Preferably the bulk of the organic reaction medium is polar aprotic solvent (that is to say, at least 50% by weight of the reaction medium is polar aprotic solvent) and the water content of the reaction medium is kept at a low level, say, less than 10%, for example 5 to 10% by weight of the reaction medium) throughout the reaction. The amalgam, resin, and the organic medium are preferably maintained in intimate admixture by, for example, stirring.

A free-radical polymerisation inhibitor may be present e.g. p-nitroso-dimethylaniline.

The products of the reaction may be separated from the reaction medium by conventional means such as filtration, decanting or cycloning followed by distillation.

The reaction mixture is preferably kept cool at around room temperature or below but higher temperatures may be convenient or tolerated under some circumstances (e.g. under production conditions).

Examples of the invention will now be described. These all involve acrylonitrile and water, but analogous results are expected when methyl or ethyl acrylate is used instead of acrylonitrile, or methyl or ethyl alcohol instead of water.

Example 1

30 g. Permutit Deacidite FF (SRA 65), a polystyrene anion exchange resin containing 0.12 mole chloride ion in conjunction with methyl quaternary ammonium groups was added to 200 ml. acetonitrile, 20 g. acrylonitrile and 10 g. water. 0.3% sodium amalgam was added at the rate of 0.6 ml./min. for 2 hrs. (equivalent to 2.94 g. sodium). Automatic addition of gaseous hydrogen chloride using a Pye Ingold glass electrode, enables indicated pH to be controlled to 9. Temperature was maintained at +5° C.

Results for this and other runs are listed in the table.

Example 2

A blank reaction was carried out without the addition of resin but otherwise simliar to Example 1. This gave a very much worse efficiency based on sodium.

Example 3

Example 1 was repeated with the addition of twice the amount of resin. There was little effect on efficiency based on sodium.

Example 4

Using similar conditions to those in Example 1 with the exception that pH was increased to 11 (in the hope that hydroxyl ions might more readily be exchanged for chloride ions from the resin) no significant increase in efficiency based on sodium was noted.

Example 5

Using similar conditions to those in Example 1 with the exception that the resin had been ground with pestle and mortar an improved efficiency based on sodium was found.

Example 6

Using similar conditions to those in Example 1 except that the resin had been ground in a ball mill for 12 hours the efficiency based on sodium had not been improved significantly over Example 1. The degree of fineness did not appear to be as great as in Example 4.

TABLE

| Example | Analysis | | | Percent recovery based on nitrogen | Percent efficiency based on Na | Percent conversion to adiponitrile based on acrylonitriles |
|---|---|---|---|---|---|---|
| | Acrylonitrile (g.) | Propionitrile (g.) | Adiponitrile (g.) | | | |
| 1 | 16.9 | 1.9 | 0.9 | 98 | 13.5 | 4.6 |
| 2 | 17.0 | 2.1 | 0.07 | 98 | 0.9 | 0.4 |
| 3 | 17.0 | 1.6 | 0.75 | 94 | 10.9 | 3.7 |
| 4 | 18.1 | 2.2 | 0.68 | 104 | 9.9 | 3.4 |
| 5 | 19.9 | 0.08 | 1.57 | 106 | 22.8 | 7.9 |
| 6 | 18.3 | | 0.54 | 94 | 7.9 | 2.2 |

We claim:

1. In a process for the reductive dimerization of a compound selected from the group consisting of acrylonitrile and lower alkyl acrylates by contacting a liquid reductive dimerization medium containing said compound with an alkali metal or alkaline earth metal amalgam, the improvement wherein the liquid reductive dimerization medium comprises at least 50% by weight of a polar aprotic organic solvent containing chloride ions furnished by an anion-exchange resin bearing quaternized amine groups and maintaining the measured pH of the medium at a value not less than 7 by supplying thereto hydrogen chloride gas.

2. A process as claimed in claim 1 wherein said medium includes up to 10% by weight of water as the proton source for said reductive dimerization.

3. A process as claimed in claim 2, wherein the water content of the medium is from 1 to 10% by weight.

4. A process as claimed in claim 1, wherein the compound is acrylonitrile.

5. A process as claimed in claim 1, wherein the chloride anions are provided by a polystyrene resin bearing methyl-quaternised amine groups.

6. A process as claimed in claim 1, wherein the polar solvent is acetonitrile.

7. A process as claimed in claim 1 wherein said compound is acrylonitile, the reductive dimerization medium contains up to 10% by weight of water as a source of protons for the reduction, the aprotic solvent is selected from the group consisting of acetonitrile, dimethylformamide and dimethyl sulphoxide, the measured pH of said medium is maintained in the range of 7 to 11.5 by supplying hydrogen chloride gas thereto and the chloride ions are furnished by a polystyrene resin bearing methyl quaternized amine groups.

References Cited

UNITED STATES PATENTS 3,356,708  12/1967  Davies et al. _____ 260—465.8

JOSEPH P. BRUST, Primary Examiner

U.S. Cl. X.R.

260—485, 465